Patented Aug. 2, 1927.

1,637,428

UNITED STATES PATENT OFFICE.

VIRGIL R. RUPP, OF QUINCY, ILLINOIS.

MINERAL FEED AND PROCESS OF PREPARING THE SAME.

No Drawing.   Application filed September 24, 1926.   Serial No. 137,631.

My invention relates to mineral feeds such as those used in connection with domestic animals and to the process of preparing the same, and it consists in the product hereinafter described and in the steps taken to the manufacture of the same.

Mineral feeds for domestic animals have been made in which certain ingredients such as salt cake, charcoal, limestone, spent bone black, etc., have been mixed with rock phosphate with a binder of some substance, such as glucose. The product has a tendency to dry out in time and to become dusty.

Calcium phosphate is a desirable ingredient of a mineral food, but the rock phosphate, which has hitherto been used as a source of calcium phosphate, has a limited use, owing to the fact that it contains fluorine which is poisonous, unless taken in small doses.

An object of my invention is to provide a mineral feed which does not dry out and become dusty.

A further object is to provide a mineral feed having rock phosphate as its source of calcium phosphate and from which the fluorine content has been greatly decreased, thereby rendering it more fit for feed and obviating any danger of poisoning.

A further object of the invention is to provide a process, by means of which the mineral feed can be made without the necessity of adding an additional binding agent which may dry out and leave the product in a dusty condition.

A further object is to provide a process, by means of which the fluorine is eliminated to a large extent and in which the acid which eliminates the fluorine also serves in connection with other ingredients to produce a gas which renders the material light.

A further object is to provide a process, by means of which calcium sulphate, which is formed in the reaction of certain of the ingredients, can be utilized as a binder, so that the product will be maintained in substantially the same condition as when first made without disintegrating or becoming dusty.

Other objects and advantages will appear in the following specification, and the novel features of the invention will be particularly pointed out in the appended claims.

In carrying out my invention, I take rock phosphate and treat it with concentrated sulphuric acid. This may be done in any suitable container. One product is calcium sulphate in the anhydrous form, while the fluorine in the rock phosphate is reduced from about 3% to 1% or less.

To the treated rock phosphate, other ingredients of the mineral mixture are added, together with water in sufficient quantity to form a semi-pasty mass. This mass can be made to cohere on the application of a slight pressure.

As an example, I have formed the mineral feed consisting of the following ingredients in the proportions specified.

| | Parts. |
|---|---|
| Treated rock phosphate | 25 |
| Limestone | 15 |
| Salt cake | 20 |
| Charcoal | 15 |
| Common salt | 10 |
| Water | 25 |

The limestone neutralizes any excess acid present, and also converts some of the acid phosphate to calcium phosphate. Carbon dioxide is given off, which lightens the mixture, and calcium sulphate is formed. This semi-pasty mass may be placed in any suitable apparatus for bringing the product into a state in which it is available for food for stock. Any suitable apparatus may be used for doing this. A device somewhat similar to the ordinary meat grinder has been used in which pressure was applied to the mass to force it through openings and in which the emerging particles were cut off by blades, so as to leave the product in pellets, which were then dried. The particular form of the food particles forms no part of the present invention nor the apparatus by which the particles are formed, since it is obvious that the food might be made up in many different shapes without departing from the spirit of the invention. The main feature of the process is the utilization of the anhydrous calcium sulphate formed in the treatment of rock phosphate for the elimination of fluorine, as the binder. It will be noted that the sulphuric acid serves a double purpose and one which it is believed has not been made use of before for preparing mineral feed. It serves as a reagent for eliminating the fluorine and it also serves to form the binding agent. Further than this, however, it serves when acting on the limestone to produce the carbon dioxide by means of which the product is puffed up and rendered light.

The limestone in the above example not only utilizes the free acid present, but also reacts with the acid phosphate, both reactions producing calcium sulphate. Furthermore, when rock phosphate is treated with concentrated sulphuric acid whereby a portion of the fluorine is eliminated, calcium sulphate is formed so that as far as the binder is concerned, it is not always necessary to add a compound of lime. In this connection, it may be stated that calcium oxide as well as calcium carbonate (limestone) may be used as an ingredient of the mineral feed.

The product, as stated, is more suitable for mineral feed because part of the poisonous portion is removed. It does not disintegrate or become dusty as those feeds in which substances like glucose is used as a binder.

I claim:

1. The herein described process of producing a mineral feed, which consists in treating rock phosphate with concentrated sulphuric acid whereby a portion of the fluorine is eliminated and calcium sulphate formed, and mixing the treated rock phosphate with other mineral elements, the calcium sulphate serving as a binder for the whole.

2. The herein described process of producing a mineral feed which consists in treating rock phosphate with concentrated sulphuric acid whereby a portion of the fluorine is eliminated, mixing the treated rock phosphate with mineral elements and water, one of said mineral elements containing a lime compound whereby calcium sulphate is formed and serves as a binder.

3. The herein described process of preparing a mineral feed which consists in treating rock phosphate with concentrated sulphuric acid whereby a portion of the fluorine is eliminated, mixing with the rock phosphate other mineral elements including one containing limestone, together with water, whereby calcium sulphate is formed from the reaction of the sulphuric acid and the lime, bringing the mixture into a coherent mass, separating the mass into particles, and drying the separated particles.

4. A mineral feed, comprising a mixture of mineral elements including a lime compound, and rock phosphate from which a portion of the fluorine has been removed, the mixture being held together by a binder of anhydrous calcium sulphate.

VIRGIL R. RUPP.